United States Patent [19]

Hagy et al.

[11] Patent Number: 6,052,778

[45] Date of Patent: Apr. 18, 2000

[54] EMBEDDED SYSTEM HAVING DYNAMICALLY LINKED DYNAMIC LOADER AND METHOD FOR LINKING DYNAMIC LOADER SHARED LIBRARIES AND APPLICATION PROGRAMS

[75] Inventors: Lee Emison Hagy, Austin; Grama Kasturi Harish, Cedar Park; James Darrell Heath, Austin; Deepak Anantarao Kulkarni, Austin; William Francis Quinn, Austin, all of Tex.

[73] Assignee: International Business Machines Corporation, Armonk, N.Y.

[21] Appl. No.: 08/782,724

[22] Filed: Jan. 13, 1997

[51] Int. Cl.[7] ................................................ G06F 9/445
[52] U.S. Cl. .............................................. 713/2; 709/305
[58] Field of Search ................................... 395/650, 400, 395/700, 575, 652, 651, 712, 685; 364/200

[56] References Cited

U.S. PATENT DOCUMENTS

| | | | |
|---|---|---|---|
| 4,430,704 | 2/1984 | Page et al. .............................. | 364/200 |
| 5,297,265 | 3/1994 | Frank et al. ............................ | 395/400 |
| 5,355,489 | 10/1994 | Bealkowski et al. ................... | 395/700 |
| 5,355,498 | 10/1994 | Provino et al. ........................ | 395/700 |
| 5,369,766 | 11/1994 | Nakano et al. ......................... | 395/685 |
| 5,375,241 | 12/1994 | Walsh .................................... | 395/700 |
| 5,410,698 | 4/1995 | Danneels et al. ...................... | 395/650 |
| 5,418,964 | 5/1995 | Conner et al. ......................... | 395/700 |
| 5,432,927 | 7/1995 | Grote et al. ............................ | 395/575 |
| 5,459,865 | 10/1995 | Heninger et al. ...................... | 395/650 |
| 5,463,766 | 10/1995 | Schieve et al. ........................ | 395/650 |

(List continued on next page.)

FOREIGN PATENT DOCUMENTS

| | | |
|---|---|---|
| 2097541 | 12/1994 | Canada . |
| 2097542 | 12/1994 | Canada . |
| 0 699 996 A1 | 3/1996 | European Pat. Off. . |
| 63-175929 | 7/1988 | Japan . |
| 1-207824 | 8/1989 | Japan . |
| 2-244237 | 9/1990 | Japan . |
| 3-022161 | 1/1991 | Japan . |
| 4-116756 | 4/1992 | Japan . |
| 4-234424 | 8/1992 | Japan . |
| 6-095869 | 4/1994 | Japan . |
| 7-182179 | 7/1995 | Japan . |
| 7-325719 | 12/1995 | Japan . |
| 2 242 293 | 9/1991 | United Kingdom . |
| WO95/01598 | 1/1995 | WIPO . |
| WO95/17062 | 6/1995 | WIPO . |

OTHER PUBLICATIONS

"Sixteen–to Thirty–Two–Bit Operating System Compatibility Method for Personal Computers," *IBM Technical Disclosure Bulletin*, vol. 34, No. 4B, pp. 314–317, Sep. 1991.

"Method to Intercept Dynamically Loaded Subroutine Calls on the IBM RISC System/6000 AIX Operating System," *IBM Technical Disclosure Bulletin*, vol. 34, No. 10A, pp. 382–387, Mar. 1992.

"Method for Dynamic Loading of Object Modules in a Graphical User Interface Development Tool," *IBM Technical Disclosure Bulletin*, vol. 36, No. 12, pp. 33–35, Dec. 1993.

(List continued on next page.)

*Primary Examiner*—Dennis M. Butler
*Attorney, Agent, or Firm*—David A. Mims, Jr.; Andrew J. Dillon

[57] ABSTRACT

A method and means for enhancing an embedded system includes means for and steps of executing a boot routine; activating a ROM loader routine; initializing an I/O subsystem; activating an embedded OS; creating a dynamically linked embedded system loader task, and having the embedded OS map the Global Coerced Memory (GCM) and the Global Shared Memory (GSM) into its address space so that it can access shared libraries; loading each of a plurality of executable programs, and mapping the GCM and the GSM into each executable program's address space so it is able to access shared libraries.

6 Claims, 3 Drawing Sheets

U.S. PATENT DOCUMENTS

| | | | |
|---|---|---|---|
| 5,465,361 | 11/1995 | Hoenninger, III | 395/700 |
| 5,475,840 | 12/1995 | Nelson et al. | 395/700 |
| 5,491,800 | 2/1996 | Goldsmith et al. | 395/200.12 |
| 5,495,611 | 2/1996 | Bealkowski et al. | 395/700 |
| 5,495,612 | 2/1996 | Hirayama et al. | 395/700 |
| 5,499,343 | 3/1996 | Pettus | 395/200.2 |
| 5,768,585 | 6/1998 | Tetrick et al. | 395/652 |
| 5,812,848 | 9/1998 | Cohen | 395/685 |

OTHER PUBLICATIONS

"Address Space Partitioning Using 'Address Submaps,'" *IBM Technical Bulletin*, vol. 37, No. 08, pp. 373–374, Aug. 1994.

"Inter–Program Binding," *IBM Technical Disclosure Bulletin*, vol. 37, No. 12, pp. 415–419, Dec. 1994.

"NetWare Loadable Modules Bindery Monitoring," *IBM Technical Disclosure Bulletin*, vol. 38, No. 07, pp. 153–154, Jul. 1995.

"Method for Allowing Original Equipment Manufacturer DOS Setting Descriptions and Contextual Help," *IBM Technical Disclosure Bulletin*, vol. 38, No. 10, pp. 141–145, Oct. 1995.

"Fast and Flexible Shared Libraries," *Proceedings of the Summer 1993 USENIX Conference*, pp. 237–251, Jun. 1993.

"Building Modular Windows Applications with C+ +," *Proceedings of OOP '93*, pp. 163–166, Feb. 1993.

"Screen Windows as Objects," *CHIP* (German), No. 12, pp. 188–194, Dec. 1990.

"Portable Multitasking in C+ +," *Dr. Dobb's Journal*, vol. 20, No. 11, pp. 70, 72, 74, 76, 78, Nov. 1995.

"Dynamic Link Libraries for DOS," *Dr. Dobb's Journal*, vol. 15, No. 5, pp. 30–39, 104–106 and 108–109, May 1990.

"HS/FORTH's Rosetta Stone Dynamic Linker," *Programming Environments*, Rochester FORTH Conference, pp. 41–42, Jun. 1988.

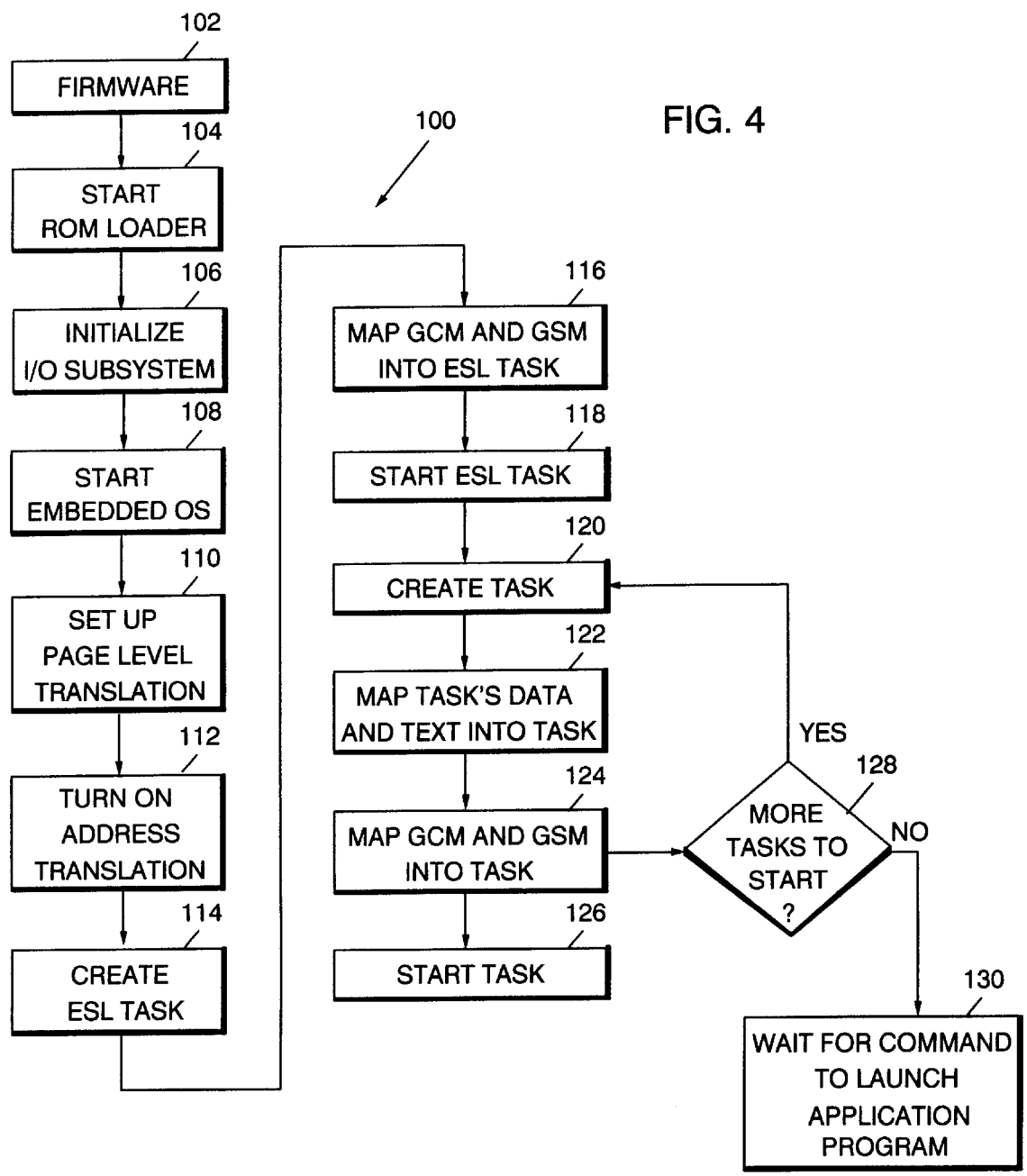

6,052,778

EMBEDDED SYSTEM HAVING DYNAMICALLY LINKED DYNAMIC LOADER AND METHOD FOR LINKING DYNAMIC LOADER SHARED LIBRARIES AND APPLICATION PROGRAMS

BACKGROUND OF THE INVENTION

1. Field of the Invention

The present invention relates to information handling systems and methods and, more particularly, to information handling systems and methods including systems and methods for dynamically linking dynamic loader programs.

1. Prior Art

In information handling systems where a kernel of an operating system is stored in a read-only memory (ROM), it is desirable to minimize the area (footprint) of the ROM on the integrated circuit carrying the ROM. In the prior art, all machine readable or executable programs including dynamically linked programs and shared libraries are preloaded into the ROM to create the embedded system. The loading of these dynamically linked programs and libraries is typically controlled by an embedded systems loader (ESL) which itself needs to use some of the shared libraries. The practice in prior art embedded systems has been to statically link the ESL to the shared libraries. This provides the desired function, but at a significant cost in ROM size, since some of the shared libraries then are duplicated in the ROM.

A system is needed which includes a dynamically linked ESL to minimize the size of the ROM in an embedded system.

SUMMARY OF THE INVENTION

Accordingly, a method and apparatus for enhancing an embedded system includes means for and steps of executing a bootstrap routine; activating a ROM loader routine; initializing an I/O subsystem; activating an embedded operating system; creating a dynamically linked embedded system loader task, and mapping the GCM (global coerced memory) and GSM (global shared memory) into its respective address space so it is able to access shared libraries; loading each of a plurality of executable programs and mapping the GCM and GSM into its respective address space so it is able to access shared libraries.

It is an advantage of the present invention that the size of the read only memory in an embedded system may be minimized by dynamically linking an embedded system loader program to eliminate the need for the read only memory to contain two copies of each shared library that the loader uses (one for itself and the other for programs that it loads).

BRIEF DESCRIPTION OF THE DRAWINGS

FIG. 4 is a flow chart showing the method in accordance with the present invention.

DETAILED DESCRIPTION OF A PREFERRED EMBODIMENT OF THE INVENTION

Embedded control systems may be implemented on one or more integrated circuit chips, where one of the chips includes a read only memory (ROM) which stores the operating system for the embedded control system. An example of such a system is the IBM Embedded Microkernel system.

Since it is generally desirable to reduce the size of the read only memory portion of the system, it is desirable to dynamically link the embedded system loader to shared libraries at embedded system generation.

Figure 1:
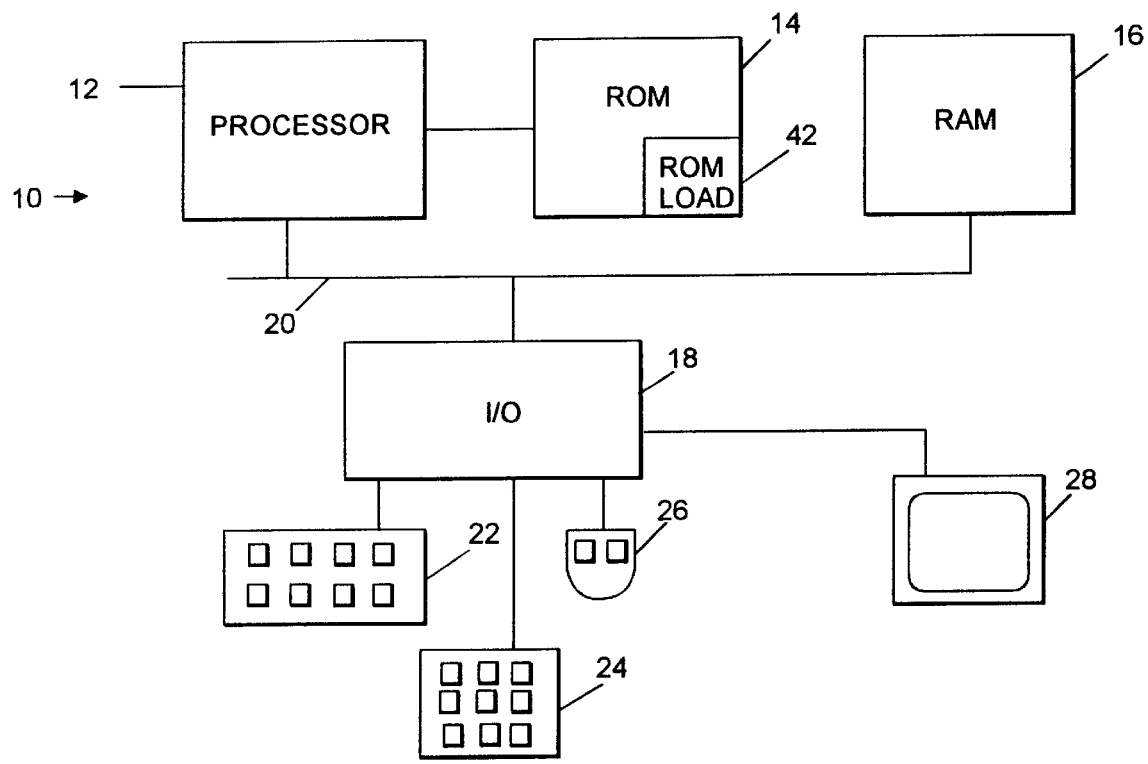
FIG. 1 is a block diagram of a system employing an embedded control system in accordance with the present invention.

Referring now to FIG. 1, a system embodying the present invention will be described.

System 10 includes a processor 12, a read only memory 14, a random access memory 16, an I/O subsystem 18, all of the above connected by system bus 20. The I/O subsystem 18 may include one or more controllers for input/output devices such as a keyboard 22 or keypad 24, a cursor control device 26, and a display device 28. Depending upon the application of the embedded system, one or more of the input/output devices may not be used in the particular application.

Figure 2:
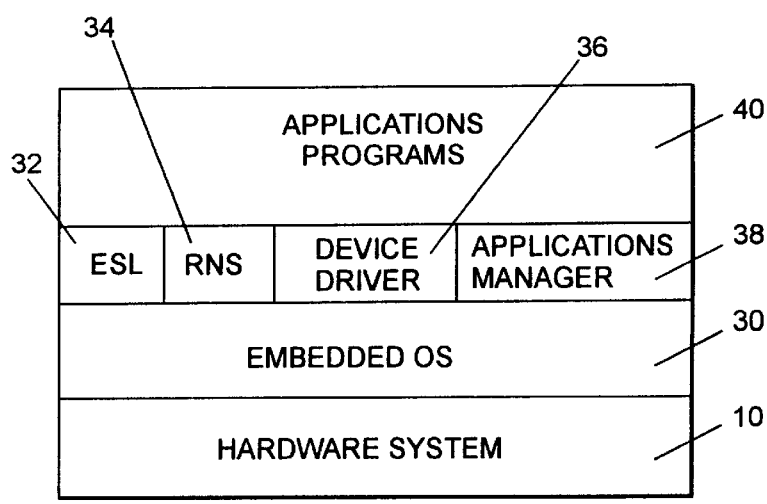
FIG. 2 is a block diagram of a system in accordance with the present invention showing the hardware and software elements thereof.

Referring now to FIG. 2, the hierarchy of the operating system, tools, utilities and application programs will be described.

The hardware system 10 described with reference to FIG. 1 is controlled by the embedded operating system 30 which in turn controls various tools and applications such the embedded system loader 32, a root name server (RNS) 34, one or more device drivers 36, an applications manager 38 and one or application programs 40. The embedded operating system 30, the ESL 32, RNS 34, device drivers 36, applications manager 38, applications 40 and a ROM loader 42 are all included in ROM 14 (see FIG. 1).

Shared Librarias

On any system that runs a set of programs one can usually isolate a number of routines that are common between all of those programs. These routines are normally encapsulated as a library.

Each of the programs then links with this library and has access to every routine in it.

Depending on the way the library is built, the program can link with it in one of two ways.

Link statically—in this case the entire library is copied in with the executable program that uses it. The advantage here is that this is simple to achieve. This, however, increases the footprint of ROM 14 as the entire library is brought in as many times as the number of executable programs that reference it.

Link dynamically—in this case shared libraries are used, i.e., only one copy of the library is loaded regardless of the number of executable programs linking with it. While this makes the tools producing the library and the loader loading the shared libraries and dynamically linked executable programs more complex and needs additional support from the kernel, it provides the benefit of a considerable savings in ROM footprint.

Pre-loading and PLF (Pre Loaded Format)

In an embedded system environment, extensive use is made of shared libraries. An exemplary binary format to be used with shared libraries is ELF (executable and linking format) an industry standard. In order to realize the savings of being dynamically linked and yet not carry the complexity and the bulk of the ELF object format into ROM 14, a two step loading process is used. All of the binary format handling capability is moved into a tool (Tool1 44) that generates the ROM image 46.

Figure 3:
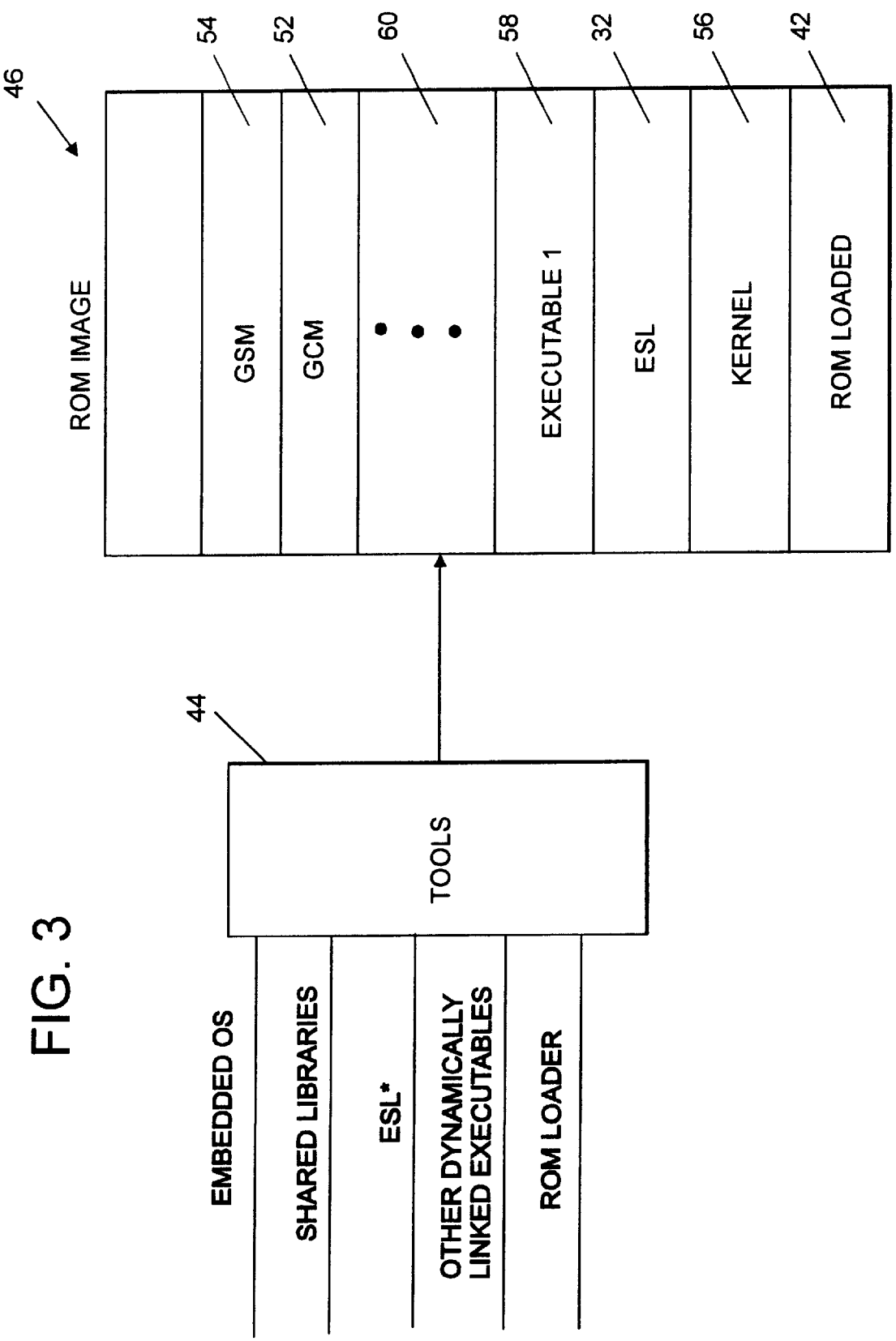
FIG. 3 is a block diagram showing the elements required for generation of the read only memory image in accordance with the present invention.

The boot up process of an embedded system embodying the present invention is described by the following steps and FIG. 3:

1. Firmware executes and passes control to ROM loader 42.
2. ROM loader 42 initializes I/O subsystem 18 and passes control to embedded OS 30.
3. The embedded OS 30 first runs in real mode, sets up page level translation and turns on address translation.
4. The embedded OS 30 creates the ESL 32 task that is dynamically linked and maps GCM and GSM into the address space of ESL 32.
5. ESL 32 then proceeds to load each of the executables up to and including a program that is started to enable the launching of one or more application programs. It is to be noted that every program following ESL 32 is dynamically linked and will require ESL 32 to map the GCM 52 and GSM 54 into its address space so as to be able to access the shared data and the shared text of the shared libraries.

Referring now to FIG. 3, Tool1 44 is a first stage loading tool that takes as its inputs ROM loader 42, embedded OS 30, the dymnamically linked ESL 32, shared libraries and dynamically linked executables. Tool1 44 outputs a binary image of ROM 14 (see FIG. 3) referred to as ROM image 46. In generating ROM image 46, Tool1 44 processes all of the ELF information contained in each binary file, loads the text and data of each executable file 58,60 and in the case of shared libraries, creates the GCM 54 (shared text) and GSM 52 (shared data). A key element is the fact that all the shared data from all the shared libraries is coalesced (by Tool1 44) into the GCM as one contiguous segment. Also, all the shared text from all the shared libraries is coalesced (by Tool1 44) into the GSM as one contiguous segment. Another key element is that the GCM is always mapped with the copy-on-write attribute set for both ESL 32 and all the executable programs that it loads. When a task writes into a page of the GCM, a private copy of that page is created in RAM for that task.

Apart from this, Tool1 44 also generates certain structures for each of the shared libraries and executables that it has loaded. This information that is used by ESL 32 is known as the Pre-loaded Format.

In the second step of loading, for each executable ESL 32 creates a task container (not shown), maps the data and text for the executable and also maps in the GCM 52 and GSM 54 for shared library access. This second step of loading happens at run-time.

The contents of ROM image 46 are ROM loader 42, embedded OS 30, ESL 32, Root Name Server (RNS) 34, device drivers 36 and application programs 40. Except for ROM loader 42 and embedded OS 30, all the other programs use a core set of libraries. Significant savings in footprint are achieved by employing shared libraries.

In the present embodiment of the present invention, off-line tool (Tool1 44) processes the ELF information. What remains is to have GCM 52 and GSM 54 segments be mapped into ESL 32 address space by the embedded OS 30 when it is created at run-time so that it may also use the preloaded shared libraries rather than bringing in another statically linked core set of libraries. This is now a simple task, since each of the GCM and GSM has been coalesced into a single segment (by Tool1 44). It is normally the ESL 32 that maps these segments into the tasks that follow it.

This discussion is in the context of embedded systems. The dynamically linked ESL 32 provides an embedded system where all tasks (including the ESL itself) are dynamically linked. That is, they use shared libraries to save memory. An example of an embedded system is a hand held computer about the size of a calculator. The basic functionality of the system is in the ROM image.

In creating the embedded system where all programs are dynamically linked, essential information from the original ELF files is condensed into the small PLF format. This reduces the size of memory in the ROM image and makes it possible to dynamically link ESL 32.

Referring now to FIG. 4, the method for creating and linking the dynamically linked loader in accordance with the present invention will be set forth.

Method 100 for creating the dynamically linked loader includes a hardware-initiated bootstrap process 102 which starts the ROM loader 104. ROM loader 104 then initializes 106 an I/O subsystem and passes control to start 108 the embedded operating system.

Next, page level translation tables are set up 110 and address translation is turned on 112. An embedded system loader task is created 114, and global coerced memory (GCM) and global shared memory (GSM) are mapped 116 into the ESL task. The ESL task is started 118. A new task is created 120; this might be a system level task such as a device driver or the like, or a user-level task such as an application program.

The data and text associated with such task are mapped 122 into the task by the ESL 32.

The GCM and GSM are mapped 124 into the task by the ESL 32. Then, the task is started 126. Also, after the mapping of the GCM and GSM into the task in step 124, a test 128 is made to determine whether there are more tasks to start. If so, the process returns to the create task step 120, and additional tasks are created. If there are no more tasks to start, then the system waits 130 for a command to launch an application program.

Although the present invention and its advantages have been described in detail, it should be understood that various changes, substitutions and alterations can be made herein without departing from the spirit or scope of the invention as defined in the appended claims.

What is claimed is:

1. A method for improving an embedded system, in an information handling system, comprising the steps of:

executing a hardware controlled boot routines;

activating a ROM loader routine;

initializing an I/O subsystem;

activating an embedded operating system;

thereafter creating a dynamically linked embedded system loader task;

mapping a global coerced memory and a global shared memory containing shared libraries of text and data into an address space of the embedded system loader task, utilizing the embedded operating system so the embedded system loader task is able to access the shared libraries;

loading one or more executable programs; and mapping the global coerced memory and the global shared memory into the address space of each executable program utilizing the embedded system loader task to enable such executable program to access the shared libraries.

2. A method, according to claim 1, wherein the loading step further comprises the step of:

loading an application launch routine.

3. A method, according to claim 1, further comprising the steps of:

controlling the creation of the global coerced memory and the global shared memory at the time of creation of a system image.

4. Apparatus for improving an information handling system including an embedded system, said apparatus comprising:

means for executing a hardware controlled boot routine;

means for activating a ROM loader routine;

means for initializing an I/O subsystem;

means for activating an embedded operating system;

means for thereafter creating a dynamically linked embedded system loader task;

means for mapping a global coerced memory and a global shared memory containing shared libraries of text and data into an address space of the embedded system loader task, utilizing the embedded operating system so the embedded system loader task is able to access the shared libraries;

means for loading one or more executable programs; and means for mapping the global coerced memory and the global shared memory into the address space of each executable program utilizing the embedded system loader task to enable such executable program to access the shared libraries.

5. An apparatus, according to claim 4, wherein the loading means further comprises:

means for loading an application launch routine.

6. An apparatus, according to claim 4, further comprising:

means for controlling the creation of the global coerced memory and the global shared memory at the time of creation of a system image.

\* \* \* \* \*